(12) United States Patent
Zhang et al.

(10) Patent No.: US 12,525,688 B2
(45) Date of Patent: Jan. 13, 2026

(54) BUS BAR, BATTERY CELL ACQUISITION ASSEMBLY AND BATTERY MODULE

(71) Applicant: EVE POWER CO., LTD., Jingmen (CN)

(72) Inventors: Tengfei Zhang, Jingmen (CN); Jie Tang, Jingmen (CN); Chengming Zhao, Jingmen (CN)

(73) Assignee: EVE POWER CO., LTD., Hubei Jingmen (CN)

( * ) Notice: Subject to any disclaimer, the term of this patent is extended or adjusted under 35 U.S.C. 154(b) by 582 days.

(21) Appl. No.: 18/148,778

(22) Filed: Dec. 30, 2022

(65) Prior Publication Data

US 2023/0246304 A1 Aug. 3, 2023

Related U.S. Application Data

(63) Continuation of application No. PCT/CN2022/129614, filed on Nov. 3, 2022.

(30) Foreign Application Priority Data

Jan. 29, 2022 (CN) .......................... 202210113139.1
Jan. 29, 2022 (CN) .......................... 202220244992.2

(51) Int. Cl.
*H01M 50/507* (2021.01)
*H01M 50/213* (2021.01)
*H01M 50/503* (2021.01)

(52) U.S. Cl.
CPC ....... *H01M 50/507* (2021.01); *H01M 50/213* (2021.01); *H01M 50/503* (2021.01)

(58) Field of Classification Search
CPC ............ H01M 50/507; H01M 50/213; H01M 50/503; H01M 2220/20; H01M 10/425;
(Continued)

(56) References Cited

U.S. PATENT DOCUMENTS

2019/0259984 A1* 8/2019 Nishikawa .......... H01M 50/247
2019/0296407 A1* 9/2019 Newman ........... H01M 10/6555

FOREIGN PATENT DOCUMENTS

CN 104425785 A * 3/2015 .......... H01M 50/227
CN 106797005 B * 3/2020 ............. B60R 16/04
(Continued)

*Primary Examiner* — Kaity V Chandler
(74) *Attorney, Agent, or Firm* — Sughrue Mion, PLLC

(57) ABSTRACT

The application discloses a bus bar, a battery cell acquisition assembly and a battery module. The bus bar is arranged to electrically connect a plurality of battery cells to form a battery cell group, and comprises a plurality of bus bar main bodies and at least one substrate. Each bus main body includes a positive conductive part and a negative conductive part, the connection part is electrically connected with the positive electrode of one battery cell, the negative connection part is electrically connected with the negative electrode of another battery cell, the positive conductive part and the negative conductive part are electrically connected through the connection part, and the surface of the connection part is provided with an insulating layer. Two adjacent bus bar main bodies are electrically connected through a substrate, and the surface of each substrate is provided with an insulating layer.

17 Claims, 4 Drawing Sheets

(58) Field of Classification Search
CPC ............ H01M 10/482; H01M 10/486; H01M 50/209; H01M 50/50; H01M 50/505; H01M 50/51; H01M 50/516; H01M 50/519; H01M 50/522; H01M 50/569; Y02E 60/10
See application file for complete search history.

(56) References Cited

FOREIGN PATENT DOCUMENTS

| | | | | | |
|---|---|---|---|---|---|
| CN | 214754065 | U | * | 11/2021 | ............. Y02E 60/10 |
| CN | 215220933 | U | * | 12/2021 | ............. Y02E 60/10 |
| JP | 2006019367 | A | * | 1/2006 | ............. Y02E 60/10 |
| JP | 2015222624 | A | * | 12/2015 | ............. B60L 58/21 |
| KR | 20200129487 | A | * | 11/2020 | .......... H01M 50/502 |
| WO | WO-2022059319 | A1 | * | 3/2022 | .......... H01M 50/284 |

* cited by examiner

BUS BAR, BATTERY CELL ACQUISITION ASSEMBLY AND BATTERY MODULE

This application is a continuation of International Patent Application No. PCT/CN2022/129614, filed on Nov. 3, 2022, pending, which claims the priority of China patent applications filed in China Patent Office on Jan. 29, 2022 with application numbers of 202220244992.2 and 202210113139.1, all of which are hereby incorporated by reference.

TECHNICAL FIELD

The application relates to the technical field of batteries, for example, to a bus bar, a battery cell acquisition assembly and a battery module.

BACKGROUND ART

Battery module is the core component of battery system. The battery module includes a plurality of battery cells, which are usually electrically connected by bus bars.

In the related technology, in order to meet the requirements of insulation and withstand voltage between two adjacent bus bars, a plastic harness isolation plate with reinforcing ribs is usually added between two adjacent bus bars to ensure a safe distance between the bus bars. This way will increase the weight of the battery system, and it is difficult to make full use of the internal space of the battery system. Due to the addition of the plastic wiring harness isolation plate, the production and assembly processes of the battery module are complicated, and the production cost is increased.

SUMMARY OF THE DISCLOSURE

The application provides a bus bar with simple structure and good universality. By arranging an insulating layer, there is no need to use a plastic wiring harness isolation plate between two adjacent bus bars, which reduces the weight of a battery module. The bus bar occupies a small space in a battery system, so that cells can be closely arranged, and the energy density of a battery module formed by connecting a plurality of cells is high.

In a first aspect, an embodiment of the present application provides a bus bar, which is configured to electrically connect a plurality of battery cells to form a battery cell group, and includes:

A plurality of bus bar main bodies, each bus bar main body including a positive conductive part and a negative conductive part, wherein the positive conductive part is electrically connected with a positive of one battery cell, the negative conductive part is electrically connected with a negative of another battery cell, and the positive conductive part and the negative conductive part are electrically connected through a connection part, and the surface of the connection part is provided with an insulating layer;

At least one substrate, two adjacent bus bar main bodies are electrically connected through one substrate, and the surface of each substrate is provided with an insulating layer.

In one embodiment, the first end of each substrate is connected to the connection part of one of the two adjacent bus bar main bodies, and the second end of each substrate is connected to the connecting part of the other bus body in two adjacent bus bar main bodies.

In one embodiment, two adjacent bus bar main bodies are arranged at intervals along a first direction and staggered along a second direction, and the first direction and the second direction are arranged at an included angle.

In one embodiment, each substrate includes a main body section and two connection sections, the two connection sections are connected by the main body section, each connection section of the two connection sections is arranged at an included angle with the main body section, and one bus bar main body is connected to the connection section of one substrate or one bus bar main body is connected to the connection section of two substrates.

In one embodiment, a through hole is provided at the connector of each of the two connection sections and the main body segment.

In one embodiment, round the connector between each of the two connection sections and the main section.

In one embodiment, two adjacent bus bar main bodies are arranged at intervals along a first direction and staggered along a second direction, and the first direction and the second direction are arranged at an included angle.

In an embodiment, the at least one substrate and the plurality of bus bars main bodies are connected to form a wave shape, and any bus bar main body is located on a wave crest or a wave trough.

In an embodiment, the at least one substrate and the plurality of bus bar main bodies are integrally formed.

In one embodiment, there is a height difference between the positive conductive part and the negative conductive part of each bus bar main body.

In one embodiment, each substrate is provided with a first fusing part.

In an embodiment, the connection part is provided with a second fusing part.

In one embodiment, the bus bar is an integrated structure.

In the second aspect, the embodiment of the present application provides a battery cell acquisition assembly, including pins and a bus bar as claimed in any one of the claims, wherein at least one end of the bus bar is connected with pins, and the pins are arranged to be in data connection with a battery management system.

In one embodiment, the pin comprises a first part and a second part which are arranged at an included angle, the bus bar is connected to the first part, and the second part is arranged to be connected with the battery management system.

In one embodiment, the first part is parallel to the end faces of the plurality of battery cells, and the second part extends along the height direction of the plurality of battery cells.

In an embodiment, the pin is connected with a signal acquisition element.

In an embodiment, the signal acquisition element is a temperature sensor.

In one embodiment, the pin is connected with a voltage signal summary board.

In one embodiment, the pins are arranged outside the battery cell group.

In one embodiment, the pin is a sheet structure.

In one embodiment, the pin is connected to a bus bar main body of at least one of two ends of the bus bar.

In the third aspect, the embodiment of the present application provides a battery module, which includes a plurality of battery cells and at least one of the above-mentioned battery cell acquisition assemblies, and a bus bar of the battery cell acquisition assembly electrically connects the plurality of battery cells.

Beneficial Effects of the Application:

The bus bar provided in the application is electrically connected with the positive of one battery cell by arranging the positive conductive part, the negative conductive part is electrically connected with the negative of another battery cell, the positive conductive part and the negative conductive part are electrically connected through the connection part, and a plurality of bus bar main bodies are electrically connected through the substrate, so that a plurality of battery cells are connected in series or in parallel to form a battery cell group. The insulating layer is arranged on the surface of the substrate and the connection part, so that the conductive contact between the bus bar is avoided, the short-circuit risk between the bus bar is reduced, the use of the plastic wiring harness isolation plate is abandoned, the internal space of the battery system is saved, and the energy density of the battery system is improved; meanwhile, the integration degree of the electrical connection of the battery cells is improved, the weight of the battery system is reduced, the current loss is reduced, the heating degree of the battery system is reduced, and the manufacturing and assembly are convenient, and the production cost is low.

The battery cell acquisition assembly provided by the application includes the bus bar. By setting a pin at one end of the bus bar, the pin is directly connected with a Battery Management System (BMS) for data, and there is no need to use a Flexible Printed Circuit (FPC)/Flexible Flat Cable (FFC) for switching, so that the Z-direction space of the battery system can be saved, and it is also conducive to realizing the lightweight of the battery system.

The battery module provided by the application adopts the battery cell acquisition assembly, and a plurality of battery cells are connected in series or parallel through the bus bar of the battery cell acquisition assembly, and are connected to the BMS through pins, so that the integration degree is high. The connection between the bus bar and the battery cell is convenient and reliable, with simple structure, less current loss, low heating degree and high safety performance. And the bus bar and pins are light in weight, thus saving the internal space of the battery system. Its structural form can make a plurality of battery cells arranged compactly, greatly improving the energy density of the battery module, and the manufacturing cost of the battery module is low.

Figure 1:
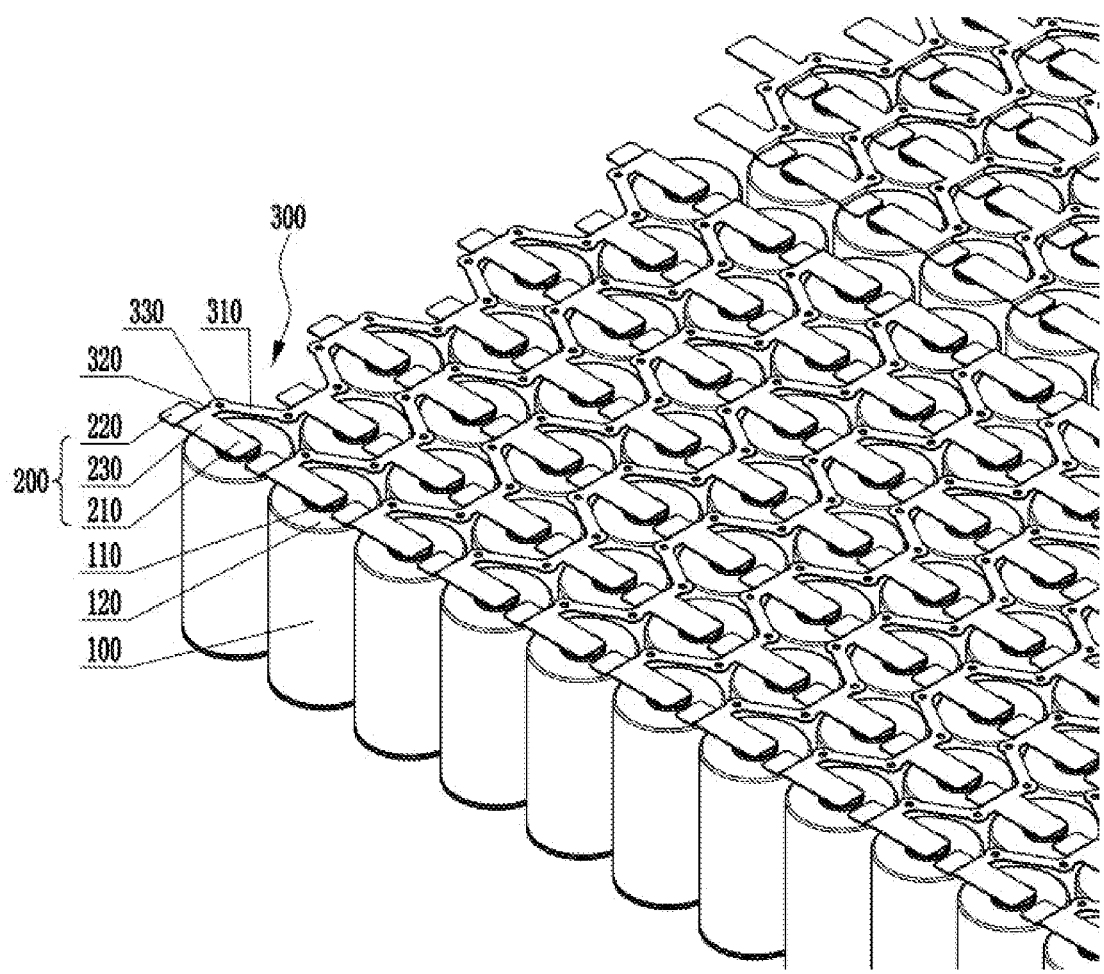
FIG. 1 is an assembly diagram of a bus bar and a battery cell provided in an embodiment of the present application.

In the figures:
100: battery cells; 110: positive electrode; 120: negative electrode; 200: bus bar main body; 210: positive conductive part; 220: negative conductive part; 230: connection part; 201: the first conductive part; 202: the second conductive part; 300: substrate; 310: main section; 320: connection section; 330: through hole; 400: pin; 500: signal acquisition element; 600: voltage signal summary board.

DETAILED DESCRIPTION

In the description of this application, it should be noted that the directions or positional relationships indicated by the terms "center", "upper", "lower", "left", "right", "vertical", "horizontal", "inner" and "outer" are based on the orientations or positional relationships shown in the drawings, only for the convenience of describing this application and simplifying the description, and are not indicated or implied. In addition, the terms "first" and "second" are only used for descriptive purposes, and cannot be understood as indicating or implying relative importance. Among them, the terms "first position" and "second position" are two different positions, and the first feature is "on top of", "above" and "on" the second feature, including that the first feature is directly above and diagonally above the second feature, or only indicates that the horizontal height of the first feature is higher than the second feature. The first feature "at the bottom of", "below" and "under" the second feature include the first feature directly below and obliquely below the second feature, or only indicate that the horizontal height of the first feature is less than the second feature.

In the description of this application, it should be noted that unless otherwise specified and limited, the terms "installation", "link" and "connection" should be understood in a broad sense, for example, they can be fixedly connected, detachably connection or integrally connection; Can be mechanically connected or electrically connected; It can be directly connected or indirectly connected through an intermediate medium, or it can be the internal communication of two elements. The specific meaning of the above terms in the present disclosure can be understood based on a specific case by those skilled in the art.

Embodiments of the present application are described below, examples of embodiments are shown in the drawings, wherein, the same or similar reference numerals denote the same or similar elements or elements with the same or similar functions. The embodiments described below with reference to the drawings are exemplary, only for explaining the application, and should not be construed as limiting the application.

Figure 2:
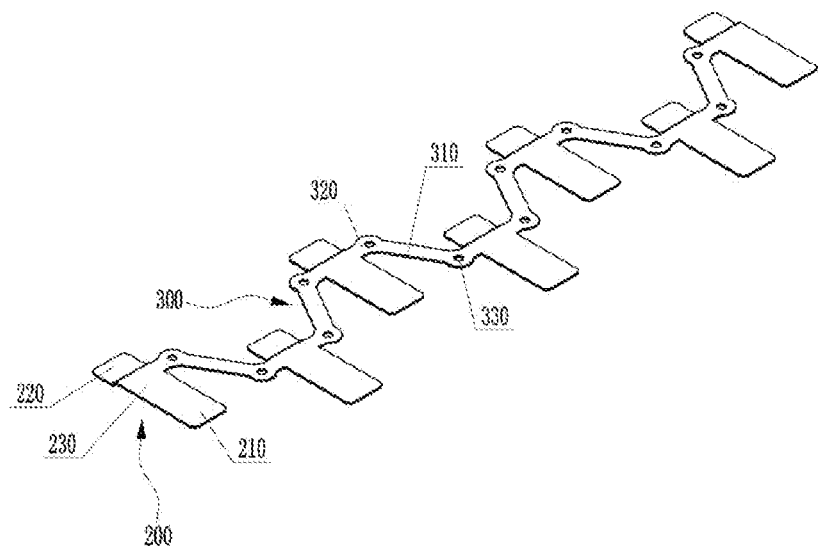
FIG. 2 is a schematic structural diagram of a bus provided in an embodiment of the present application.

FIG. 1 shows an assembly diagram of a bus bar and a battery cell 100 provided in this embodiment. FIG. 2 shows a schematic structural diagram of a bus bar provided in this embodiment. Referring to FIGS. 1 and 2, the bus bar is arranged to electrically connect a plurality of battery cells 100 to form a battery cell group, and includes a plurality of bus bar main bodies 200 and a substrate 300. Each bus bar body 200 includes a positive conductive part 210 and a negative conductive part 220. The positive conductive part 210 is electrically connected with the positive electrode 110 of one battery cell 100, and the negative conductive part 220 is electrically connected with the negative electrode 120 of another battery cell 100. The positive conductive part 210 and the negative conductive part 220 are electrically connected through a connection part 230, and the surface of the connection part 230 is provided with an insulating layer. Adjacent bus bar main bodies 200 are electrically connected with each other through a substrate 300, and the surface of the substrate 300 is also provided with an insulating layer.

In the above-mentioned bus bar, the substrate 300 is used as an overcurrent part, and two adjacent bus bar main bodies 200 are electrically connected through the substrate 300. The positive conductive part 210 of the bus bar body 200 is electrically connected with the positive electrode 110 of one battery cell 100, and the negative conductive part 220 is electrically connected with the negative electrode 120 of the other battery cell 100, so that a plurality of battery cells 100 are connected in series or in parallel by the bus bar to form a battery cell group. The application can effectively avoid the risk of short circuit between bus bars due to contact by setting an insulating layer on the surface of the substrate 300 and the connection part 230, and improve the safety of the battery system. The insulating layer can replace the plastic wire harness isolation plate in the related technology, saving the internal space of the battery system, thus effectively improving the energy density of the battery module of the battery system. At the same time, the insulating layer and the bus bar are integrated, which improves the integration degree of the electrical connection of the battery cell 100 and reduces the number of parts, thus reduce the weight of the battery system, reduce its heating degree, simplify the assembly and manufacturing, and reduce the production cost.

Optionally, the insulating layer is an insulating film coated on the surfaces of the connection part 230 and the substrate 300, or it can be made by spraying insulating materials on the surfaces of the connection part 230 and the substrate 300, or it can be made by other methods, as long as it is a structure that can insulate the connection part 230 and the substrate 300, it is within the scope of protection of this application.

Referring to FIGS. 1 and 2, the bus bar is a sheet-like structure, which can greatly reduce the weight of the bus bar, reduce the overall weight of the battery module, and minimize the space occupied by the bus bar in the battery system, which is conducive to improving the energy density of the battery module. In this embodiment, the bus bar body 200 is rectangular, and its corners are rounded to reduce stress concentration and increase the structural strength of the bus bar main body 200. As shown in FIG. 2, the number of bus bar main body 200 is seven, which can connect fourteen battery cells 100. In other embodiments, the number of bus bar main bodies 200 can be three, five, nine, etc., which can be set as needed. The shape of bus bar main bodies 200 is not limited to rectangle, but can be set in other shapes as needed. The bus bar main body 200 can be made of aluminum (alloy), copper (alloy), nickel or other conductive materials. The bus bar main body 200 in this embodiment is simple in structure, easy to process and easy to connect with the battery cell 100.

The positive conductive part 210 of the bus bar main body 200 can be connected with the positive electrode 110 of one battery cell 100, and the negative conductive part 220 can be connected with the negative electrode 120 of another battery cell 100 by welding. Since there is a height difference between the positive electrode 110 and the negative electrode 120 of the battery cell 100, there is also a height difference between the positive electrode conductive part 210 and the negative electrode conductive part 220 of the bus bar main body 200 in order to match the structure of the battery cell 100. Illustratively, the connecting part 230 of the bus bar main body 200 and the positive conductive part 210 of the bus bar main body 200 are in the same plane, and the negative conductive part 220 of the bus bar main body 200 and the connection part 230 of the bus bar main body 200 are arranged in a stepped manner to facilitate the connection between the bus bar main body 200 and the battery cell 100. In this embodiment, the pole is the positive electrode 110 of the battery cell 100. In other embodiments, the pole can also be the negative electrode 120 of the battery cell 100.

Adjacent bus bar main bodies 200 are arranged at intervals along the first direction and staggered along the second direction, and the first direction and the second direction form an included angle. In this embodiment, the first direction is the width direction of the bus bar main body 200, and the second direction is the length direction of the bus bar main body 200. The first direction and the second direction are perpendicular. Two adjacent bus bar main bodies 200 are staggered along the length direction, so that the connected a plurality of battery cells 100 are alternately staggered. Because the plurality of battery cells 100 in a cell group are staggered, the plurality of battery cells 100 can be closely spliced together, thus making full use of the internal space of the battery system and improving the energy density of the battery module. In other embodiments, a plurality of bus bar main bodies 200 may be aligned along the second direction, so that the connected cells 100 are arranged in a matrix.

The first end of the substrate 300 is connected to the connection part 230 of one bus bar main body 200, and the second end of the substrate 300 is connected to the connecting part 230 of another bus bar main body 200, thus facilitating the installation of the insulating layer. In this embodiment, the substrate 300 and the bus bar main body 200 are connected to form a wave shape, and the bus bar main body 200 is located on the wave crest or wave trough. In other embodiments, the bus bar main body 200 can be connected with the substrate 300 to form a straight line or other forms.

The substrate 300 includes a main body section 310 and two connection sections 320, the two connection sections 320 are connected by the main body section 310, the connection section 320 is arranged at an included angle with the main body section 310, and the bus bar main body 200 is connected to the connection section 320. With this structure, it is convenient for the battery cells 100 to be closely arranged. In other embodiments, the substrate 300 can also have a straight line structure or other structural forms, as long as it can electrically connect the adjacent bus bar main bodies 200, all of which are within the scope of protection of this application.

In the application, a through hole 330 can be provided at the connector of the connection section 320 and the main body section 310, and the through hole 330 is provided for positioning and increasing the structural strength. Rounding the connector between the connection body section 320 and the main body section 310 can reduce stress concentration and make the connection between the connection section 320 and the main body section 310 more reliable. The material of the substrate 300 can be aluminum (alloy), copper (alloy), nickel and other metal materials, or other conductive materials. The material of the substrate 300 and the bus bar main body 200 may be the same or different. The substrate 300 and the bus bar main body 200 can be integrally formed by stamping or the like, or can be fixedly connected by welding or riveting.

The substrate 300 may be provided with a first fusing part, which can fuse by self-heating when the circuit temperature is too high due to extreme conditions such as short circuit, so as to quickly cut off the current between adjacent battery cells 100 and cut off the current circuit, thus playing a role in protecting the circuit and improving the safety of the battery system. The first fuse part can be formed by thinning the part or coating a low melting point metal. Optionally, a second fusing part may be provided at the connection part 230, which has the same function as the first fusing part. The manufacturing method of the second fusing part can be the same as or different from that of the first fusing part.

The bus bar provided by the application is electrically connected with the positive electrode of one battery cell by arranging the positive electrode conductive part, the negative electrode conductive part is electrically connected with the negative electrode of another battery cell, the positive conductive part and the negative electrode conductive part are electrically connected through the connection part, and a plurality of bus bar main bodies are electrically connected through the substrate, so that a plurality of batteries are connected in series or in parallel to form a battery cell group. The insulating layer is arranged on the surface of the substrate and the connection part, so that the conductive contact between the bus bars is avoided, the short-circuit risk between the bus bars is reduced, the use of the plastic wiring harness isolation plate is abandoned, the internal space of the battery system is saved, and the energy density of the battery system is improved; meanwhile, the integration degree of the electrical connection of the battery cells is improved, the weight of the battery system is reduced, the current loss is reduced, the heating degree of the battery system is reduced, and the manufacturing and assembly are convenient, and the production cost is low.

Figure 3:
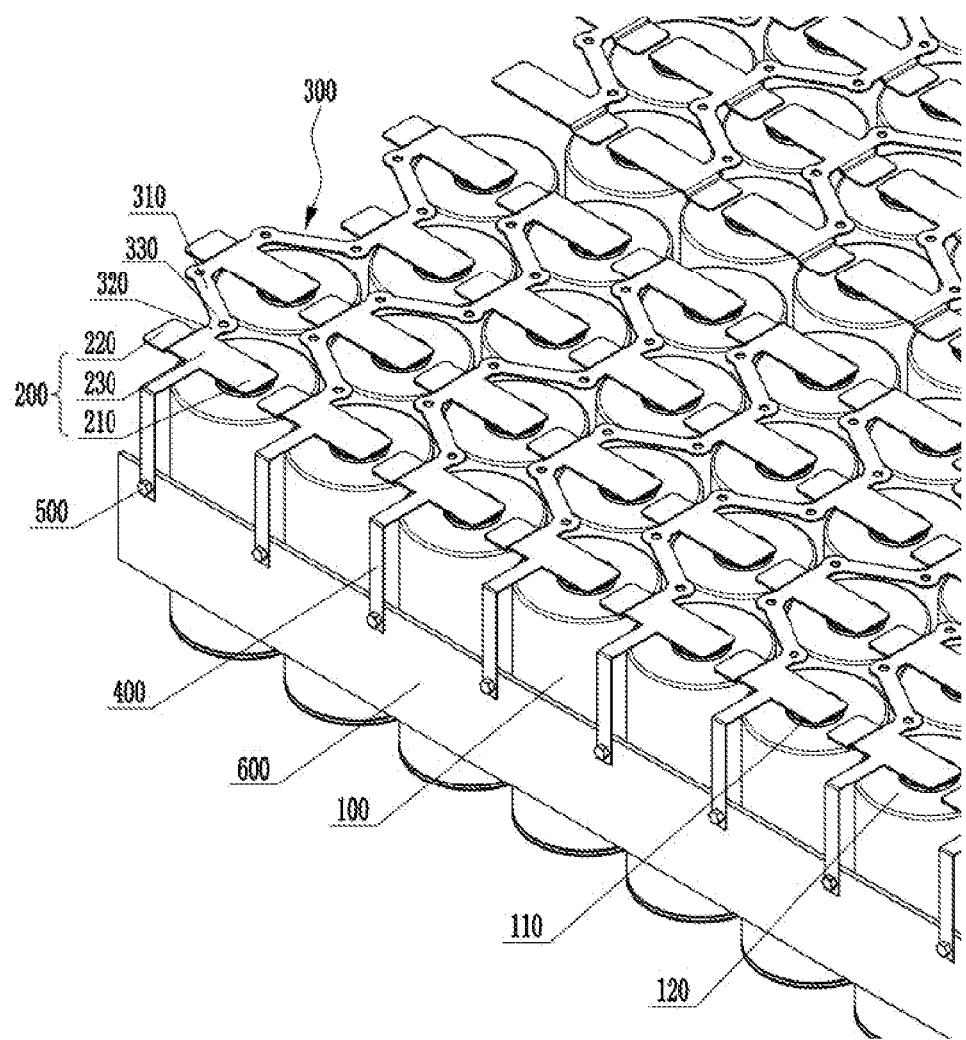
FIG. 3 is an assembly diagram of a battery cell acquisition assembly and a battery cell provided by an embodiment of the present application.

Referring to FIG. 3, this embodiment also provides a battery cell acquisition module, which includes a pin 400 and the bus bar, at least one end of which is connected with the pin 400, and the pin 400 is configured to be connected with a Battery Management System (BMS) in data. Optionally, the pin 400 has a sheet structure, including a first part and a second part which are arranged at an included angle, the bus bar is connected to the first part, and the BMS is connected to the second part. In order to facilitate the layout inside the battery system, the second part extends downward along the height direction of the battery cells 100, and the pins 400 are arranged outside the battery cell group. In other embodiments, the included angle between the first part and the second part is not limited to 90°, but also can be 0°, 30°, 60°, etc. The second part can also be arranged between two adjacent rows of battery cells 100 or at other positions, and the specific structure can be set according to the actual use requirements.

The pin 400 is connected with a signal acquisition element 500, which can be one or more of a temperature sensor, a voltage acquisition device, a pressure sensor and a humidity sensor. The pin 400 is connected to the voltage signal summary board 600, and then connected to the BMS through the voltage signal summary board 600, so as to transmit the voltage signal collected by the signal acquisition element 500 to the BMS. The arrangement of the pins 400 replaces the traditional Flexible Printed Circuit (FPC)/Flexible Flat Cable (FFC), thus reducing the use of parts, lightening the weight of the battery system and saving the internal space of the battery system. Understandably, the pin 400 is made of conductive material, and can be integrally formed with the bus bar by stamping, or can be fixedly connected by welding or riveting.

The battery cell acquisition assembly provided by the application comprises the bus bar, and the pin is arranged at one end of the bus bar, and the pin is directly connected with BMS for data, so that FPC/FFC is not needed for switching, the Z-direction space of the battery system is saved, and the light weight of the battery system is also facilitated.

This embodiment also provides a battery module, which includes a plurality of battery cells 100 and at least one of the above battery cell acquisition assembly, and the bus bars of the battery cell acquisition assembly electrically connect the plurality of battery cells 100. A plurality of battery cells 100 are electrically connected by bus bars, and conductive contact between bus bars is avoided by arranging insulating layers, so that the short-circuit risk between bus bars is reduced, and the complex bus bars structure and the plastic wiring harness isolation plate structure in the related art are replaced. The bus bar at the output end of the battery cell can be cut from the complete bus bar or produced separately. Through the pin 400, the battery cell 100 and BMS are connected in data, and the connection is convenient and reliable. The battery module has simple structure, low current loss, low heating degree and high safety performance. And the bus bar and pins 400 adopt a sheet structure, which is light in weight and saves the internal space of the battery system. The structure of the bus bar can make a plurality of battery cells 100 arranged compactly, which greatly improves the energy density of the battery module and reduces the manufacturing cost of the battery module.

The battery module provided by the present application adopts the battery cell collection assembly, and a plurality of battery cells are connected in series or parallel through the bus bar of the battery cell acquisition assembly, and are connected to the BMS through pins, so that the integration degree is high. The connection between the bus bar and the battery cell is convenient and reliable, with simple structure, less current loss, low heating degree and high safety performance. And the bus bar and pins are light in weight, thus saving the internal space of the battery system. Its structural form can make a plurality of battery cells arranged compactly, greatly improving the energy density of the battery module, and the manufacturing cost of the battery module is low.

Figure 4:
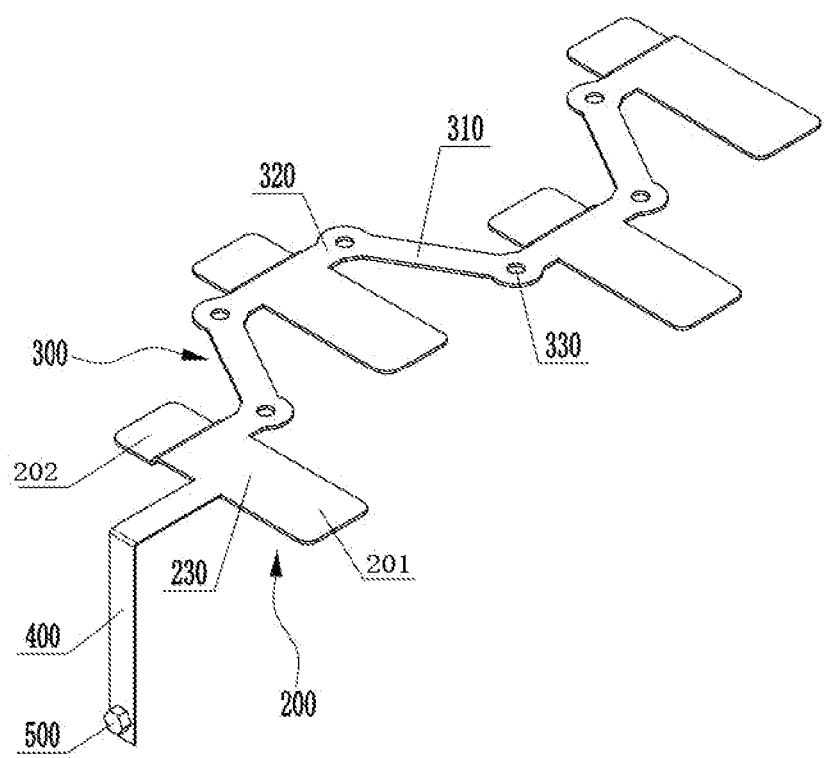
FIG. 4 is a schematic structural diagram of a bus provided by another embodiment of the present application.
Figure 5:
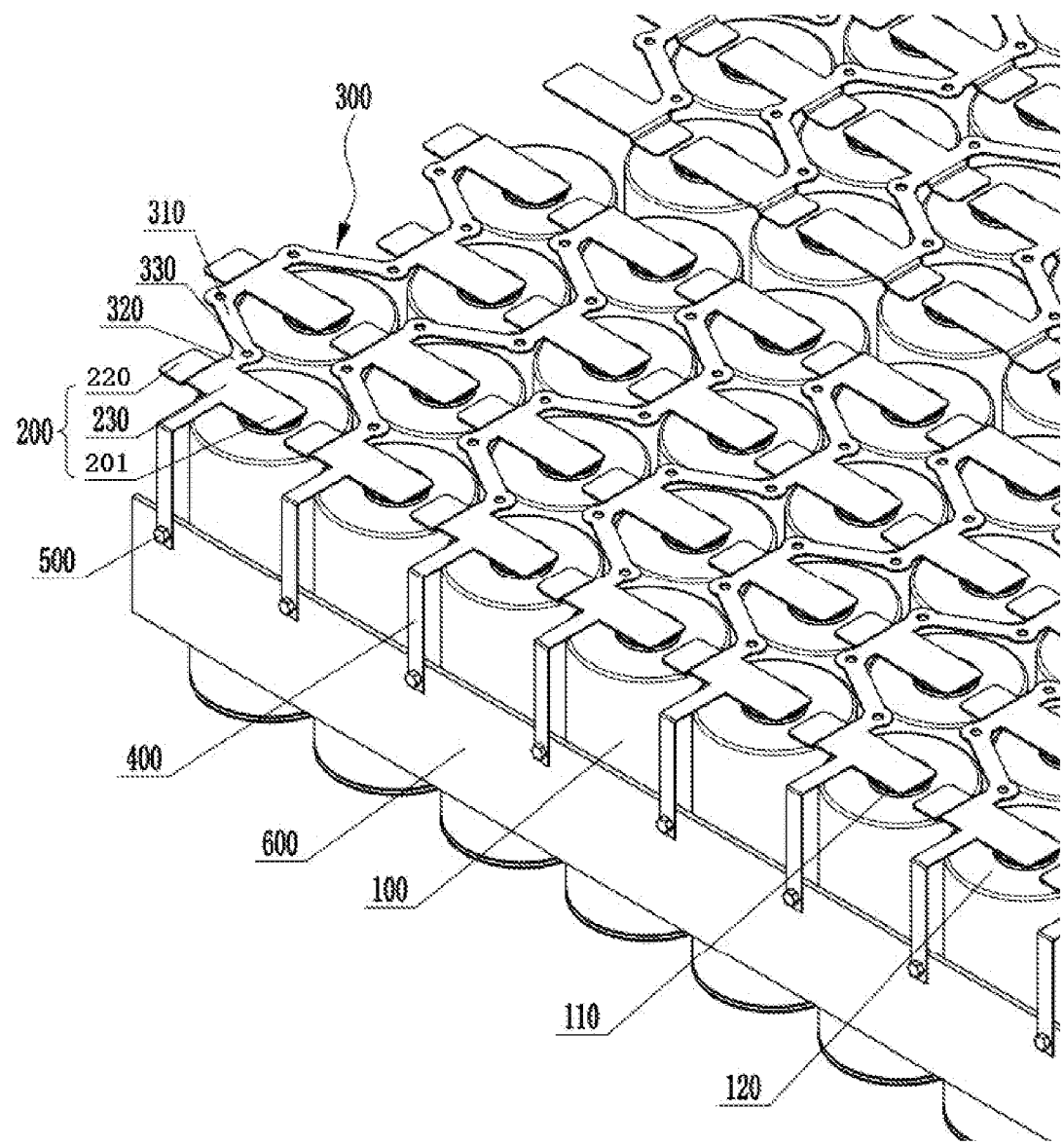
FIG. 5 is an assembly diagram of a bus bar and a battery cell provided in an embodiment of the present application.

FIG. 4 is a schematic structural diagram of a bus bar provided in another embodiment. FIG. 5 is an assembly diagram of a bus bar and a battery cell 100 according to an embodiment. Referring to FIGS. 4 and 5, the bus bar is configured to electrically connect a plurality of battery cells 100 to form a battery cell group, and includes a plurality of bus bar main bodies 200, a substrate 300 and pins 400. Each bus bar main body 200 includes a first conductive part 201 and a second conductive part 202, the first conductive part 201 is electrically connected with the first electrode 110 of one battery cell 100, the second conductive part 202 is electrically connected with the second electrode 120 of another battery cell 100, and the first conductive part 201 and the second conductive part 202 are electrically connected through a connection part 230. Two adjacent bus bar main bodies 200 are electrically connected through the substrate 300. The pin 400 is connected to the bus main body 200, and the pin 400 is provided for data connection with the BMS. In this embodiment, the first conductive part 201 is a positive conductive part, the second conductive part 202 is a negative conductive part, the first electrode is a positive electrode, and the second electrode is a negative electrode. In other embodiments, the first conductive part 201 is a negative conductive part, the second conductive part 202 is a positive conductive part, the first electrode is a negative electrode, and the second electrode is a positive electrode, which can be set according to actual requirements.

The above bus bar is electrically connected by the first conductive part 201 of the bus bar main body 200 and the first electrode 110 of a battery cell 100, and the second conductive part 202 is electrically connected with the second electrode 120 of another battery cell 100, and two adjacent bus bar main bodies 200 are electrically connected through the substrate 300, so that realize a plurality of battery cells 100 are connected in parallel or in series, and form a battery cell group. By arranging pins 400 on the bus main body 200, signal acquisition is realized. With this kind of structure, the bus bar is simple in structure and occupies a small space. The pin 400 can be connected to BMS, and the information such as the voltage and temperature of a plurality of cells 100 connected to the bus bar can be directly transmitted to BMS through the pin 400, thus replacing the traditional FPC/FFC, thus reducing the use of parts and assemblies, lightening the weight of the battery system, saving the use of Z-direction space of the battery system and improving the energy density of the battery system.

Referring to FIGS. 4 and 5, the bus bar is a sheet structure, which can greatly reduce the weight of the bus bar, reduce the overall weight of the battery module, and minimize the space occupied by the bus bar in the battery system, which is conducive to improving the energy density of the battery module. The bus bar can be an integrated structure, made by stamping or other processes, or a split structure, with a plurality of assemblies connected by welding or bonding. In this embodiment, the corner of the bus bar main body 200 is rounded, which can reduce the stress concentration and increase the structural strength of the bus bar main body 200. Of course, the shape of the bus bar main body 200 is not limited to this, and may be set to other shapes as required. The bus bar main body 200 can be made of aluminum (alloy), copper (alloy), nickel or other conductive materials. The bus bar main body 200 in this embodiment is simple in structure, easy to process and easy to connect with the battery cell 100.

The pin 400 has a sheet structure, including a first part and a second part, the first part and the second part are connected at an included angle, the bus bar main body 200 is connected to the first part, and the battery management system is connected to the second part. In this embodiment, in order to facilitate the layout of a plurality of assembles in the battery system, the first part is parallel to the end face of the battery cell 100, and the second part extends along the height direction of the battery cell 100, that is, the first part and the second part are vertically connected to form an L-shape. Optionally, according to the internal space layout of the battery system, the second part extends downward along the height direction of the battery cell 100. In this embodiment, both the first part and the second part are straight, but in other embodiments, they may have other shapes. The included angle between the first part and the second part can be 0, connected to form a straight line, or other angles, which can be set according to the internal space layout of the battery system. The pin 400 is connected to a bus main body 200 at least one of the two ends of the bus, and the second part is arranged outside the battery pack and connected to the connecting part 230 of a bus main body 200, so as to facilitate the connection between the battery cells 100 and the signal acquisition elements. In other embodiments, the second part can be arranged between two adjacent rows of battery cells 100 or at other positions, and it can be arranged according to actual needs. The pin 400 is made of conductive material, and can be integrally formed with the connecting part 230 by stamping, or can be fixedly connected by welding or riveting.

In order to effectively avoid the risk of short circuit between bus bars due to contact, an insulating layer is provided on the surface of the connection part 230 and the substrate 300. By providing insulating layers on the surfaces of the substrate 300 and the connection part 230, the safety of the battery system is improved. The insulating layer can replace the plastic wire harness isolation plate in the related technology, saving the internal space of the battery system, thus effectively improving the energy density of the battery module of the battery system. At the same time, the insulating layer is arranged on the surface of the substrate 300 and the connection part 230, which improves the integration degree of the electrical connection of the battery cell 100 and reduces the number of parts used, thus reducing the weight of the battery system, reducing its heating degree, simplifying the assembly and manufacturing, and reducing the production cost. Optionally, the insulating layer is an insulating film coated on the surfaces of the connection part 230 and the substrate 300, such as PET blue film. It can also be made by spraying insulating materials on the surfaces of the connection part 230 and the substrate 300, or by other methods, as long as it is a structure that can insulate the connection part 230 and the substrate 300, it is within the scope of protection of this application.

The first conductive part 201 and the battery cell 100, and the second conductive part 202 and the battery cell 100 can be connected by welding. Because there is a height difference between the positive electrode 110 and the negative electrode 120 of the battery cell 100, in order to match the structure of the battery cell 100, the connection part 230 of the bus bar main body 200 and the first conductive part 201 of the bus bar main body 200 are in the same plane, and the second conductive part 202 of the bus bar main body 200 and the connection part 230 of the bus bar main body 200 are arranged in a stepped manner to facilitate the connection between the bus bar main body 200 and the battery cell 100.

Adjacent bus bar main bodies 200 are arranged at intervals along a first direction and staggered along a second direction, and the first direction and the second direction form an included angle. In this embodiment, the first direction is the width direction of the bus bar main body 200, and the second direction is the length direction of the bus bar main body 200. The first direction and the second direction are perpendicular, that is, two adjacent bus bar main bodies 200 are staggered along their length directions. With this structural design, the connected multiple battery cells 100 are alternately arranged in a staggered manner, and the plurality of battery cells 100 in a cell group are arranged in a staggered manner, so that the multiple battery cells 100 can be closely spliced together, thereby making full use of the internal space of the battery system and improving the energy density of the battery module. In other embodiments, the first direction and the second direction are set as required. Of course, the bus bar main bodies 200 can be arranged side by side along a straight line, so that the connected battery cells are arranged in a matrix.

The first end of the substrate 300 is connected to the connection part 230 of one bus bar main body 200, and the second end of the substrate 300 is connected to the connection part 230 of another bus bar main body 200, thus facilitating the installation of the insulation layer. In this embodiment, the substrate 300 and the bus bar main body 200 are connected to form a wave shape, and the bus bar main body 200 is located on the wave crest or wave trough. The substrate 300 includes a main body section 310 and two connection sections 320, the two connection sections 320 are connected by the main body section 310, and the bus main body 200 is connected to the connection section 320, and the connection sections 320 are arranged at an included angle with the main body section 310, so that the bus bar main body 200 can be staggered. In other embodiments, the substrate 300 can also have an straight line structure or other structural forms, as long as it can electrically connect the adjacent bus bar main bodies 200, all of which are within the scope of protection of this application.

A through hole 330 may be provided on the main body section 310, and the through hole 330 is provided to position and increase the structural strength. The fillet treatment is carried out at the connector of the main body section 310 and the connection section 320 to reduce stress concentration and make the connection between the connection section 320 and the main body section 310 more reliable. The material of the substrate 300 can be aluminum (alloy), copper (alloy), nickel and other metal materials, or other conductive materials. The material of the substrate 300 and the bus bar main body 200 may be the same or different. The substrate 300 and the bus bar main body 200 can be integrally formed by stamping, or can be fixedly connected by welding or riveting.

Referring to FIG. 5, this embodiment also provides a battery cell acquisition module, which includes the bus bar and the signal acquisition element 500, and the pin 400 is arranged to be in data connection with the signal acquisition element 500. The signal acquisition element 500 can be a temperature sensor, or one or more of a voltage acquisition element, a pressure sensor, a humidity sensor, etc. The signal acquisition element 500 is connected to the BMS through a pin 400 to output the information of the battery cell 100 to the BMS. The pin 400 can be connected to the voltage signal summary board 600, which is connected to the BMS, thereby outputting the voltage information of the battery cell to the BMS.

This embodiment also provides a battery module, which includes a plurality of battery cells 100 and at least one of the above battery cell acquisition assembles, and the bus bars of the battery cell acquisition assemblies electrically connect the plurality of battery cells 100. The BMS is connected through the pin 400, which has a high degree of integration. The bus bar and the pin 400 adopt a thin sheet structure, which is light in weight and saves the internal space of the battery system. The structure of the bus bar can make a plurality of battery cells 100 arranged compactly, which greatly improves the energy density of the battery module, and the manufacturing cost of the battery module is low. By setting insulation layer to avoid conductive contact between buses, the risk of short circuit is reduced, and the complex bus bar structure and plastic wire harness isolation plate structure in related technologies are replaced. The bus bar at the output end of the battery cell can be cut from the complete bus bar or produced separately. The data connection between the battery cell 100 and the BMS through pin 400 is convenient and reliable. The battery module has simple structure, low current loss, low heating degree and high safety performance.

The invention claimed is:

1. A battery cell acquisition assembly, including a pin and a bus bar configured to electrically connect a plurality of battery cells to form a battery cell group, comprising:
    a plurality of bus bar main bodies, each of the bus bar main bodies including a positive conductive part, a negative conductive part, and a connection part, wherein the positive conductive part is electrically connected with a positive electrode of one of the plurality of battery cells, and the negative conductive part is electrically connected with a negative electrode of another one of the plurality of battery cells, the positive conductive part and the negative conductive part are electrically connected through the connection part, and the connection part has a first surface that includes a first insulating layer;
    at least one substrate, wherein:
        two adjacent bus bar main bodies are electrically connected through one of the at least one substrate, and the each of the at least one substrate has a second surface that includes a second insulating layer;
        the pin comprises a first part and a second part at a first included angle;
        the bus bar includes at least one end connected to the first part of the pin, and the second part of the pin is connected with a battery management system; and
        the first part of the pin is parallel to end faces of the plurality of battery cells, and the second part of the pin extends along a height direction of the plurality of battery cells.

2. The battery cell acquisition assembly according to claim 1, wherein each of the at least one substrate includes a first end connected to the connection part of a first one of the two adjacent bus bar main bodies, and a second end connected to the connection part of the other one of the two adjacent bus bar main bodies.

3. The battery cell acquisition assembly according to claim 1, wherein each of the at least one substrate includes a main body section and two connection sections, the two connection sections are connected by the main body section, and each connection section of the two connection sections is at a second included angle with the main body section, and each of the two connection sections is connected to one of the plurality of bus bar main bodies.

4. The battery cell acquisition assembly according to claim 3, wherein each of the two connection sections includes a through hole.

5. The battery cell acquisition assembly according to claim 3, wherein each of the two connection sections has a round shape.

6. The battery cell acquisition assembly according to claim 1, wherein the two adjacent bus bar main bodies are arranged at intervals along a first direction and are staggered along a second direction, and the first direction and the second direction are at a third included angle.

7. The battery cell acquisition assembly according to claim 1, wherein the at least one substrate and the plurality of bus bar main bodies are connected to form a wave shape, and each of the plurality of bus bar main bodies is on a wave crest or a wave trough.

8. The battery cell acquisition assembly according to claim 1, wherein the at least one substrate and the plurality of bus bar main bodies are integrally formed.

9. The battery cell acquisition assembly according to claim 1, wherein there is a height difference between the positive conductive part and the negative conductive part of each bus bar main body.

10. The battery cell acquisition assembly according to claim 1, wherein each of the at least one substrate includes a first fusing part.

11. The battery cell acquisition assembly according to claim 1, wherein the connecting part includes a second fusing part.

12. The battery cell acquisition assembly according to claim 1, further comprising a signal acquisition element connected with the pin.

13. The battery cell acquisition assembly according to claim 12, wherein the signal acquisition element is a temperature sensor.

14. The battery cell acquisition module according to claim 1, further comprising a voltage signal summary board connected with the pin.

15. The battery cell acquisition assembly according to claim 1, wherein the pin is outside of the battery cell group, and the pin has a sheet structure.

16. The battery cell acquisition assembly according to claim 1, wherein the pin is connected to one of the plurality of bus bar main bodies at an end of the bus bar.

17. A battery module, including the plurality of battery cells and the battery cell acquisition assembly according to claim 1, wherein the bus bar electrically connects the plurality of battery cells.

* * * * *